United States Patent [19]

Balemboy et al.

[11] Patent Number: 5,169,260
[45] Date of Patent: Dec. 8, 1992

[54] DEVICE FOR LINKING TWO OBJECTS BY SEVERAL FIXING POINTS

[75] Inventors: Jean-Luc Pavec, Margaux; Jean-Claude Girol, Bordeaux, all of France

[73] Assignee: Aerospatiale Societe Nationale Industrielle, France

[21] Appl. No.: 717,026

[22] Filed: Jun. 18, 1991

[30] Foreign Application Priority Data

Jul. 4, 1990 [FR] France ................... 90 08470

[51] Int. Cl.⁵ .............................. B25G 3/18
[52] U.S. Cl. ...................... 403/322; 403/349
[58] Field of Search ............ 403/348, 349, 322

[56] References Cited

U.S. PATENT DOCUMENTS

| | | | |
|---|---|---|---|
| 4,784,543 | 11/1988 | Mitchell et al. | 403/349 X |
| 4,917,525 | 4/1990 | Duncan | 403/349 X |
| 4,968,183 | 11/1990 | Hannus et al. | 403/349 X |

FOREIGN PATENT DOCUMENTS

| | | |
|---|---|---|
| 2354679 | 5/1974 | Fed. Rep. of Germany . |
| 2927273 | 10/1980 | Fed. Rep. of Germany . |
| 8122144 | 11/1981 | France . |

Primary Examiner—Andrew V. Kundrat
Attorney, Agent, or Firm—Hayes, Soloway, Hennessey & Hage

[57] ABSTRACT

Device for linking two objects, one of these objects (1) bearing sections of mobile bayonets (3) connected by connecting rods (4) to enable them to be controlled simultaneously. The other object bears fixed bayonet sections. Mobile bayonet sections (3) are preferably composed of two concentric rings (7) and (9) connected by a freeable ratchet mechanism (12) for breaking up the movement into one phase for establishing the link by the bayonets and one wedge clamping phase. The rotation of the bayonets is only authorized if the action of a locking system (20) is interrupted. Application for the linking of portions of aeronautical, space or submarine vehicles.

10 Claims, 3 Drawing Sheets

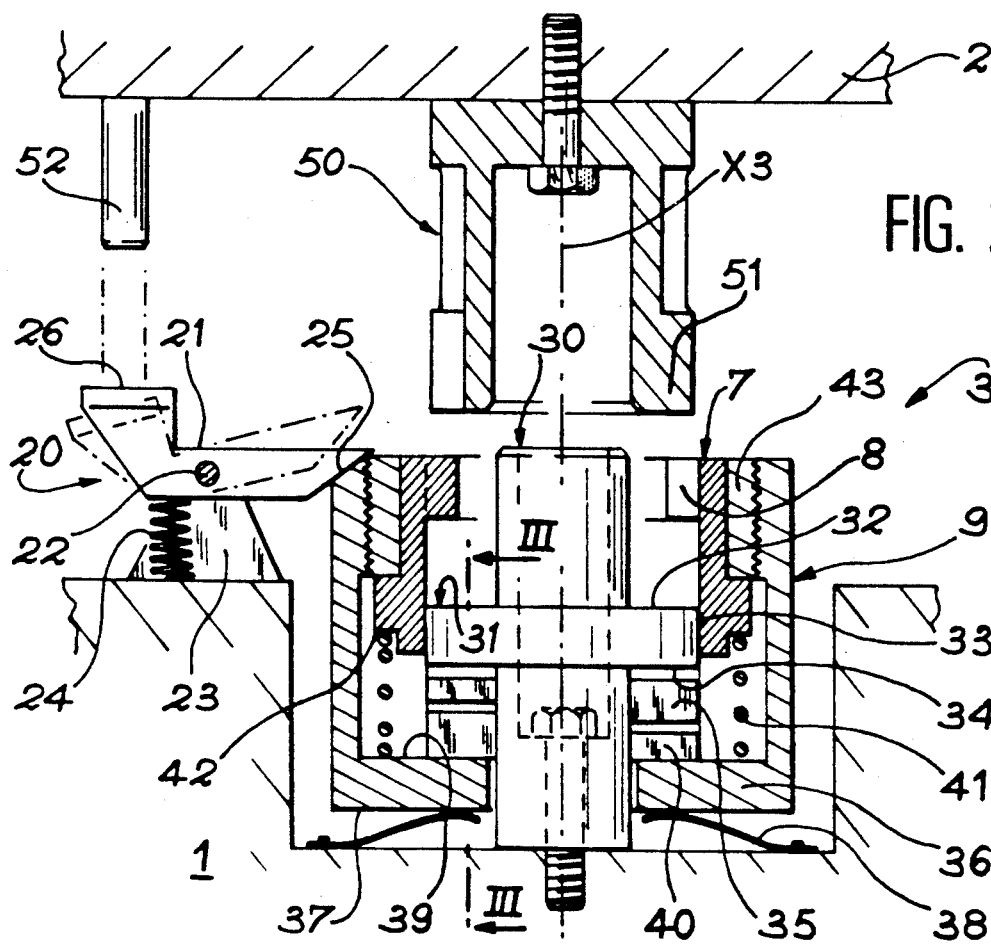
FIG. 2
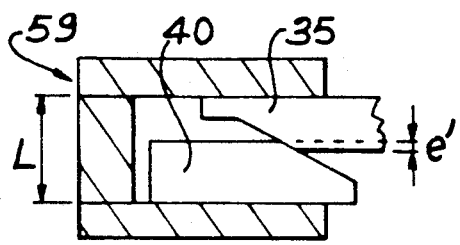
FIG. 3A
FIG. 3B
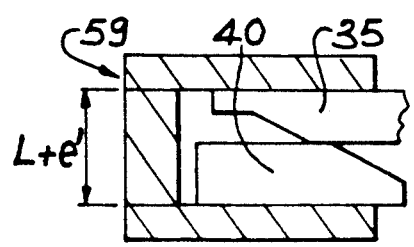
FIG. 3C
FIG. 3D

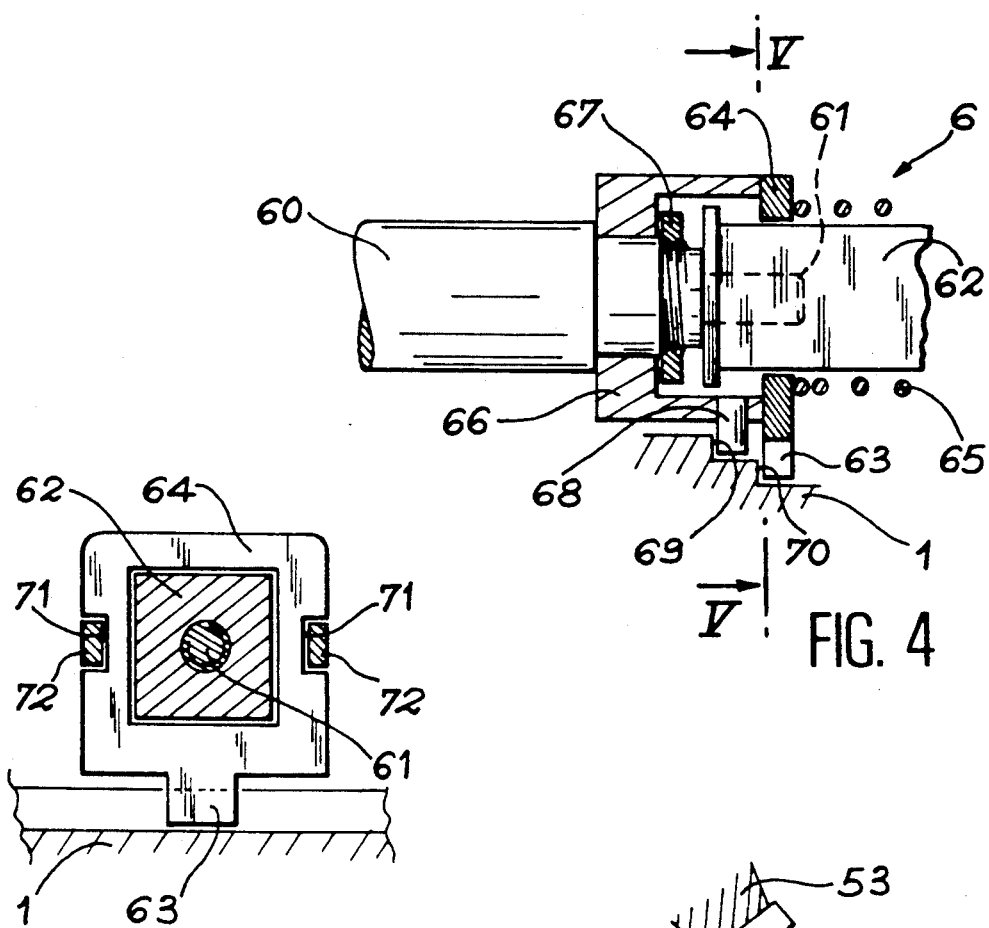
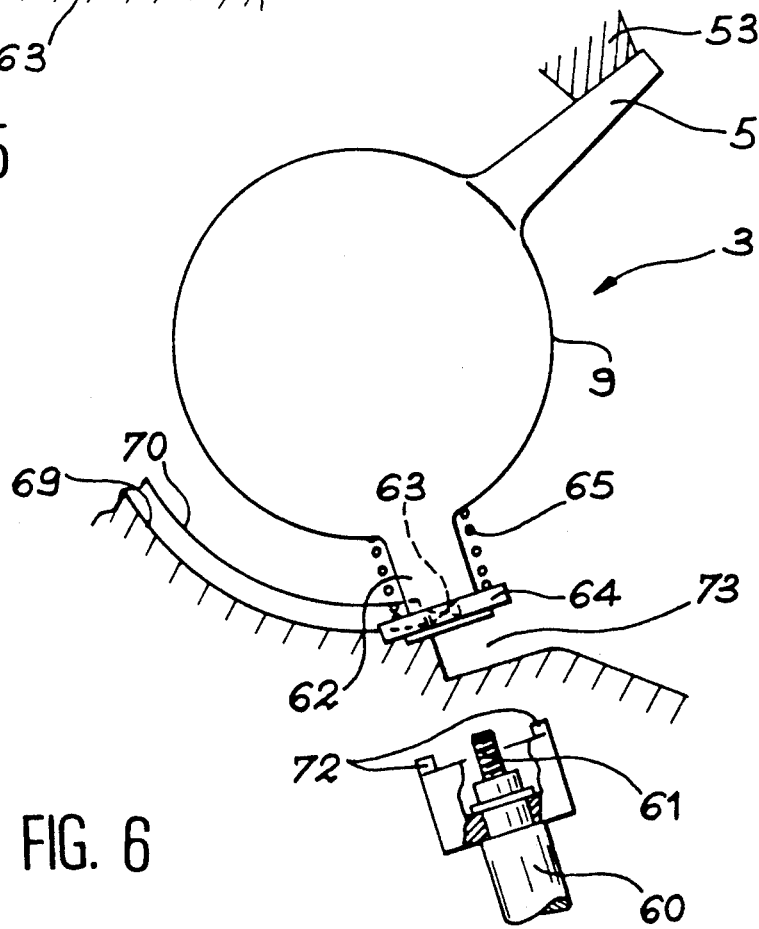

DEVICE FOR LINKING TWO OBJECTS BY SEVERAL FIXING POINTS

FIELD OF THE INVENTION

The invention concerns a device for linking a first object and a second object by means of several fixing points.

BACKGROUND OF THE INVENTION

The French patent 2 516 893 describes a device which, in certain respects, is similar to the device of the present invention: each fixing point includes a clamp secured to one of the objects and which is able to clamp a tab belonging to the other object. The clamps are constituted in such as way that an articulated lever-shaped staple keeps them in a tab clamping position. The staples may, however, be withdrawn under the action of a triggering system which includes a control element and taut cables and passing through the extremity of the levers. When the control element is used, the cables are released from the latter and return to the free state, which causes the staples to tilt. Then it is possible to open the clamps and free the second object.

This system is particularly advantageous for simultaneously releasing several fixing points. When the second object needs to be fixed, it is essential to be able to gain access to each of the fixing points so as to engage the tab in the corresponding clamp.

SUMMARY OF THE INVENTION

The invention, on the other hand, concerns a linking device in which manual activity is reduced to a minimum and where a stable link may be obtained quickly without requiring the need to check each fixing point or even gaining access to the latter.

Each fixing point includes a bayonet device. A bayonet device includes two cylindrical portions able to be nested inside each other, one of these portions including at least one tenon and the other having a groove bent inward or forming an angle in which a respective tenon slides. This nesting includes a movement for driving one of the two portions into the other followed by a relative rotation which locks them together.

A single bayonet is traditionally used to interconnect two objects and each section of the bayonet is rigidly fixed to one of the objects, which means that the objects undergo a relative rotation at the time they are fixed. However, this does not apply in the present invention. Each fixing point includes one rotary bayonet section and a system for the rotary locking of the rotary bayonet section of the first object, and one fixed bayonet section, as well as a freeing system designed in such a way as to interrupt the effect of the system for locking on the second object. In addition, the sections of the rotary bayonets are interconnected by connecting rods and there is also a clamping system constituted by wedges on the first object and at least one of the rotary bayonet sections. This clamping system is advantageously available for each fixing point.

According to one preferred disposition, the rotary bayonet sections are composed of two rings, mutually free in rotation yet united by a locking system able to be free in a wedge clamping direction. One of the rings is designed so as to be nested with one fixed bayonet section and the other bears one of the wedges of the clamping system. This disposition makes it possible to break down the linking process into one phase for nesting the bayonet sections and in which the two rings rotate together and one clamping phase in which only the ring bearing one of the wedges remains mobile. In this case, it is advantageous that a spring be disposed between one of the connecting rods and the first object so as to move the rotary bayonet sections from a position where the locking system acts to a position where the wedges are clamped.

More security is possible if one of the rotary bayonet sections is provided with a snug handle pushed back by a compressed spring between the latter and the rotary bayonet section. The first object is then provided with a ramp on which the snug is placed and which has a recess where the snug is able to penetrate under the action of the spring to the wedge clamping position. The handle may then include a gripping portion able to be detached from the snug at this position.

BRIEF DESCRIPTION OF THE DRAWINGS

There now follows a detailed description of a preferred embodiment of the invention, given by way of illustration and being non-restrictive, with reference to the accompanying figures:

FIG. 2 is a view along the section II—II of FIG. 1 also showing the second object and the essential elements of the device;

FIGS. 3A to 3D are views of the successive states of the wedge clamping system along the section III—III of FIG. 2;

FIG. 4 is a cutaway view of the snug handle;

FIG. 5 is a view along the section V—V of FIG. 4, and

FIG. 6 shows the gripping portion of the handle detached from the rotary bayonet sections.

DETAILED DESCRIPTION OF THE INVENTION

Figure 1:
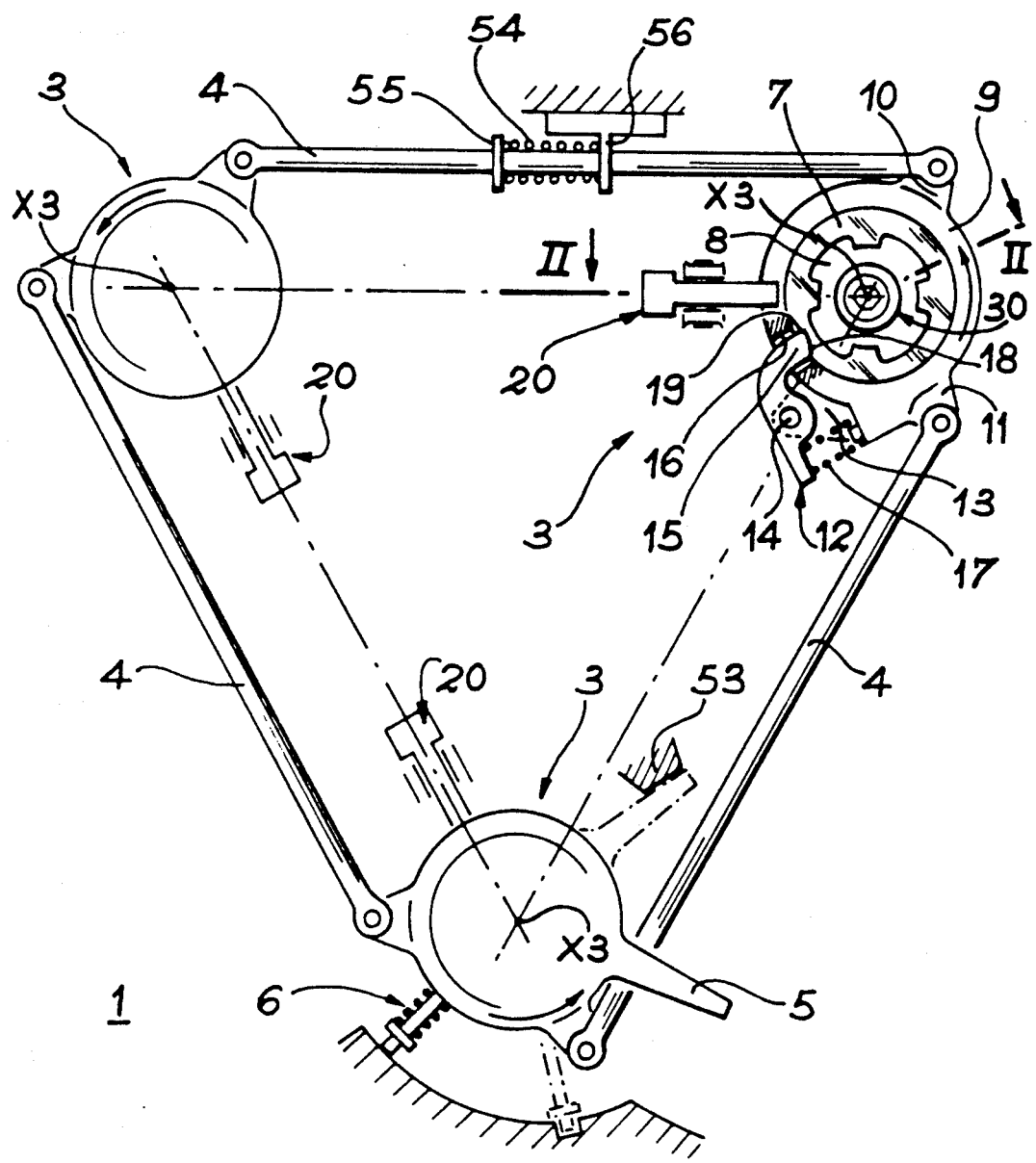
FIG. 1 is a full face view of the first object and the essential elements of the device.

The invention may be used to connect two objects 1 and 2, such as portions of aeronautical or space vehicles, and also both in zero-gravity or under water and in air. On FIG. 1, the first object 1 bears three rotary bayonet sections 3 disposed according to an equilateral triangle for linking the objects 1 and 2 via three fixing points. The rotary bayonet sections 3 rotate around axes X3 parallel to one another and perpendicular to the plane face of the first object 1 on which the rotary bayonet sections 3 are mounted. Three connecting rods 4 connect the rotary bayonet sections 3 two by two and thus define the sides of an equilateral triangle referred to above.

Three fixing points provide the link with good stability. It is possible to improve stability so as to form more complex polygons linking with more connecting rods.

The rotary bayonet sections 3 are generally similar to one another, except for one bearing a control lever 5 and a snug handle device 6 to be described subsequently. These sections are composed of two concentric rings mobile with respect to each other around the axis X3. As can be seen also on FIG. 2, one internal ring 7 bears grooves or nesting recesses 8 and one external ring 9 bears two tabs 10 and 11 joined to two connecting rods 4, as well as a catch device 12 intended to unite in certain conditions the two rings 7 and 9. In order to do this, the catch 12 is rotary-mounted on a tab 13 outside the external ring 9 with the aid of a pivot pin 14 and it includes a catching portion 15 which extends through a recess 16 of the external ring 9 as far as the external circumference of the internal ring 7. A spring 17 compressed between the opposing portion of the catch 12 and the outer ring 9 presses the catching portion 15 against the internal ring 7.

The locking portion 15 acts on the internal ring 7 by means of a surface composed of one sliding portion 18 being slightly slanted with respect to the circumference of the internal ring 7, and one stop portion 19 contiguous to the sliding portion 18 with a roughly radial extension orientated in the direction opposite the sliding portion 18.

A locking system 20 is situated close to each external ring 9. As shown on FIG. 2, it includes a tilting lever 21 rotating around a pivot pin 22 fixed by a tab 23 to the first object 1. A spring 24 is compressed between the tilting lever 21 and the first object 1 so as to place the latter in a notch 25 of the external ring 9. The resultant engagement prevents the external ring 9 from rotating.

The two rings 7 and 9 rotate around a fixed rod 30 screwed onto the first object 1 and which materialize the axis X3. The fixed rod 30 bears an external flange 31 having one upper surface 32, one external surface 33 around which the internal ring 7 is centered, and one lower surface 34 bearing at least one wedge 35. The external ring 9 has a bottom 36 whose lower surface 37 compresses a washer spring 38 against the first object 1 in the direction of the axis X3 and whose upper surface 39 bears at least one second wedge 40 which rubs against one of the preceding wedges 35. A helical spring 41 is compressed between this upper surface 39 and a lower surface 42 of the internal ring 7, which is thus pushed back towards the second object 2 and kept in place by means of a mounting nut 43 screwed into the top of the internal wall of the external ring 9. The nut 43 ensures centering of the internal ring 7.

The second object 2 bears, for each fixing point, a fixed bayonet section 50 provided with relief sections 51 for engagement in the recesses 8 of the internal ring 7. Furthermore, a stop 52 is disposed on the second object 2 opposite a heel 26 of each of the tilting levers 21 approximately in the projection of the spring 24.

With reference again to FIG. 1, it shall be observed that the first object 1 also includes a crash stop 53 reached by the control lever 5 once the linking of the two objects 1 and 2 has been completed. In addition, a helical spring 54 is engaged around one of the connecting rods 4 and compressed between one ring 55 of the latter and one fixed ring 56 situated on the first object 1.

FIGS. 3A to 3D summarize the functioning of the wedge system. Each of the wedges 35 and 40 includes an oblique surface, respectively 57 and 58, and one horizontal surface (perpendicular to the axis X3), respectively 45 and 46.

FIG. 3A shows the initial configuration of the system: the oblique surfaces 57 and 58 slide with respect to each other when the wedges 35 and 40 draw closer together, which provokes spacing of the external flange 31 and the bottom 36 and reduces the play e which extends in the direction of the axis X3 between the wedges 35 and 40, and an assembly 59 composed of the rings 7 and 9 and the relief sections 51 and whose height at rest is L between the support faces of the wedges 35 and 40. FIG. 3B shows a situation in which the play has totally disappeared and the horizontal surfaces 45 and 46 are still spaced by a space e'. The bringing together of the wedges 35 and 40 then results in causing an elongation of the assembly 59 until the position is reached shown on FIG. 3C and in which the assembly is extended by the space e' and the horizontal surfaces 45 and 46 start to slide with respect to each other. The additional coming together of the wedges 35 and 40 (FIG. 3D) no longer has any effect on the assembly 59 which thus exerts a uniform clamping force of the wedges 35 and 40.

In this case, the clamping force is transmitted between the lower surface 34 of the external flange 31 and the upper surface 39 of the bottom 36 through the relief sections 51, the itnernal ring 7, the nut 43 and the external ring 9. It is this external ring, in particular its relatively thin cylindrical portion, which undergoes most of the elongation. The space e' is defined so that the deformations remain elastic.

The link between the objects 1 and 2 is effected by placing the fixed bayonet sections 50 in front of the mobile bayonet sections 3: the objects 1 and 2 are subjected to a bringing together movement along the axis X3 which makes the relief sections 51 penetrate into the recesses 8 until the upper surface 32 of the external flanges 31 contacts the bottom of the fixed bayonet sections 50. However, the stop 52 of each fixing point strikes the heel 26 slightly beforehand and causes the tilting lever 21 to tilt. The helical spring 54 then springs back so as to move the connecting rods 4 and make the three mobile bayonet sections 3 rotate anticlockwise, as shown on FIG. 1, as far as a position in which tbhe internal rings 7 rotary abut against the fixed bayonet sections 50. It shall be observed, and this is one of the main advantages of the invention, that this movement may only occur if all the stops arrive in front of the heels 26. In other words, the link between the two objects 1 and 2 may only occur if all the fixing points are effectively used.

The operator then seizes the control lever 5 and continues the rotary movement. The internal rings 7 then abut against the fixed bayonet sections 50 and thus remain immobile. Only the external rings 9 rotate and the catches 12 are progressively freed from the recesses of the internal rings 7 via the sliding of the sliding portions 18. The clamping of the wedges 35 and 40 occurs during this phase and the movement is interrupted when the control lever 5 rests on the crash stop 53. Manual action may be replaced by the action of a force multiplier tool, such as a turnbuckle placed between one fixed point of the first object 1 and the lever 5 and which moves the latter by warping.

The system is reversible in that it is possible to carry out an indefinite number of alternate links and disconnections of the two objects 1 and 2. Disconnections are effected with inverse operations: the control lever 5 is made to rotate clockwise so as to move the external rings 9, then also the internal rings 7 when the stop face 19 of the catches 12 comes into contact with the recesses of the internal rings 7. The helical spring 54 is then reset and, when the second object 2 is withdrawn, the tilting levers 21 fall back into the notches 25 and again block the rotary bayonet sections 3.

The clamping of the wedges 35 and 40 makes it possible to block the device in a position for linking the objects 1 and 2 and thus provides a certain irreversibility. However, it is possible to add to the device a system increasing security. This in fact concerns the handle and snug device 6. Reference may be made to FIGS. 4, 5 and 6 for a description of this device.

The handle includes a detachable portion 60 having one threaded extremity 61 screwed into one fixed section 62 connected to the external ring 9 of the rotary bayonet section 3 in question. A stop snug 63 is borne by a pierced plate 64 sliding on the fixed portion 62 and pushed back by a helical spring 65 compressed between this pierced plate 64 and the external ring 9. The pierced plate 64 abuts against a casing 66 whose detachable portion 60 passes through the bottom. A washer 67 makes it possible to make the detachable portion 60 rotate with respect to the casing 66 whilst rendering these two pieces translation-integral. The casing 66 bears a blocking snug 68.

FIG. 5 shows that the rotation of the pierced plate 64 with respect to the fixed section 62 is impossible due to the fact that the section of the latter is square. Moreover, the pierced plate 64 is provided with two notches 71 which receive the notches 72 of the casing 66 so that the latter is kept fixed in rotation. The snugs 68 and 63 are thus respectively kept in external 69 and internal arc of a circle-shaped ramps 70 established on the first object 1.

FIG. 6 shows the ramps 69 and 70 being interrupted at a position reached by the snugs 68 and 63 when the control lever 5 rests against the crash stop 53 and when the first object 1 has here a nook 73. It is then possible to unscrew the detachable portion 60: the external ramp 69 ramp 69 no longer opposes the backward movement of the blocking snug 68 and accordingly the helical spring 65 gradually pushes back the pierced plate 64 and the stop snug 63 which is no longer impeded by the internal ramp 70. The detachable portion 60 is finally removed from the rotary bayonet sections 3 and the stop snug 63 prevents any accidental rotation of the linking device in a direction which could interrupt the link between the objects 1 and 2.

The detachable portion 60 constitutes a good means for easily and umambiguously checking that the linking device has been engaged as far as the desired position.

Without departing from the context of the invention, the device described may be modified, that is by changing its shape or disposition, adding elements to it or, on the other hand, by suppressing structural elements without modifying its essential characteristics.

What is claimed is:

1. A device for linking a first object and a second object at least at two fixing points, and including at each fixing point at least one rotary bayonet section and at least one fixed bayonet section, comprising:
   means for rotary-locking said rotary bayonet section on said first object to said fixed bayonet section on said second object;
   means for interrupting said rotary locking means and thus releasing said second object;
   connecting rods interconnecting said rotary bayonet section; and
   clamping means further comprising wedge means on said first object and at least one of said rotary bayonet sections.

2. The device according to claim 1, wherein said first object further comprises means for connecting rods and said rotary bayonet sections from a position where said rotary locking means locks said rotary bayonet section toward a position where said wedge means are clamped.

3. The device according to claim 1, wherein said rotary bayonet sections, are adapted with said wedge means further comprising;
   two concentric rings, mutually free in rotation, one of said two rings being adapted for nesting with one fixed bayonet section;
   one of said wedge means being adapted to the other of said two rings; and
   catch means adapted to be freed in one clamping direction, of said wedge means and interconnecting said two rings.

4. The device according to claim 3, further comprising a catch means which includes a mobile catch mounted on one of said concentric rings and resting on a support surface, of said other ring, including at least one stop portion and at least one sliding portion.

5. The device according to claim 1, further comprising spring means disposed on said first object such that said spring means urges said rotary bayonet sections to draw said wedges together.

6. The device according to claim 1, wherein at least one of said rotary bayonet sections includes:
   a snug handle;
   compression spring means between said handle and said rotary bayonet section; and
   said first object being adapted to receive said snug handle such that said snug handle, upon rotation of said rotary bayonet section to said locked position, engages said adapted first object in the clamping position.

7. The device according to claim 6, wherein said handle includes one detachable snug handle gripping section at the wedge clamping position.

8. The device according to claim 1, wherein at least one of said rotary bayonet sections includes a manual rotation lever.

9. The device according to claim 1, comprising a plurality of fixing points.

10. The device according to claim 1, wherein all said rotary bayonet sections are adapted to comprise said wedge means.

* * * * *

UNITED STATES PATENT AND TRADEMARK OFFICE
CERTIFICATE OF CORRECTION

PATENT NO. : 5,169,260

DATED : December 8, 1992

INVENTOR(S) : Christophe Balemboy, Jean-Luc Pavec and Jean-Claude Girol

It is certified that error appears in the above-identified patent and that said Letters Patent is hereby corrected as shown below:

Claim 1, Col. 6, line 4, "section" should read --sections--.

Claim 2, Col. 6, line 9, after "for" insert --urging said--.

Signed and Sealed this

Twelfth Day of October, 1993

*Attest:*

BRUCE LEHMAN

*Attesting Officer*  *Commissioner of Patents and Trademarks*